(12) United States Patent
Zhan et al.

(10) Patent No.: US 11,932,487 B2
(45) Date of Patent: Mar. 19, 2024

(54) HANDLING ROBOT AND HANDLING ASSEMBLY THEREOF

(71) Applicant: HAI ROBOTICS CO., LTD., Shenzhen (CN)

(72) Inventors: Qingxin Zhan, Shenzhen (CN); Zhe Kong, Shenzhen (CN); Yeguang Chen, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 286 days.

(21) Appl. No.: 17/389,183

(22) Filed: Jul. 29, 2021

(65) Prior Publication Data
US 2021/0354920 A1    Nov. 18, 2021

Related U.S. Application Data

(63) Continuation of application No. PCT/CN2020/073623, filed on Jan. 21, 2020.

(30) Foreign Application Priority Data

Jan. 31, 2019   (CN) .......................... 201920182152.6

(51) Int. Cl.
| | |
|---|---|
| B65G 1/04 | (2006.01) |
| B65G 1/10 | (2006.01) |
| B65G 47/82 | (2006.01) |

(52) U.S. Cl.
CPC .............. *B65G 1/0492* (2013.01); *B65G 1/10* (2013.01); *B65G 47/82* (2013.01)

(58) Field of Classification Search
CPC ......... B65G 47/82; B65G 1/10; B65G 1/0492
See application file for complete search history.

(56) References Cited

U.S. PATENT DOCUMENTS

| | | | |
|---|---|---|---|
| 9,469,477 B1 | 10/2016 | Palamarchuk | |
| 2017/0334644 A1* | 11/2017 | Otto | B66F 9/07 |

FOREIGN PATENT DOCUMENTS

| | | |
|---|---|---|
| CN | 207551834 U | 6/2018 |
| CN | 108408315 A | 8/2018 |

(Continued)

OTHER PUBLICATIONS

International Search Report for PCT/CN2020/073623.
(Continued)

*Primary Examiner* — Saul Rodriguez
*Assistant Examiner* — Willie W Berry, Jr.
(74) *Attorney, Agent, or Firm* — J.C. PATENTS

(57) ABSTRACT

Provided are a handling robot (600) and a handling assembly (100) thereof, and the handling assembly (100) includes a base component (10), a handling arm component (20), a hook (31) and a driving component (40). The handling arm component (20) is slidably mounted to the base component (10), and may perform a reciprocating linear movement on the base component (10). The driving component (40) is connected with the handling arm component (20), for driving the handling arm component (20) and the hook (31) to perform a reciprocating linear movement. Through the above structure, the handling assembly (100) pulling and pushing the material box (500) is realized without extending into two sides of the material box (500), thereby saving working space of the handling assembly (100), enabling the material boxes (500) of the warehousing to be placed next to each other, and improving the storage density of the warehouse.

19 Claims, 7 Drawing Sheets

(56) References Cited

FOREIGN PATENT DOCUMENTS

| | | |
|---|---|---|
| CN | 108408316 A | 8/2018 |
| CN | 208150249 U | 11/2018 |
| CN | 209522153 U | 10/2019 |
| CN | 209758195 U | 12/2019 |
| DE | 3020791 A1 | 12/1981 |
| JP | S4881268 A | 10/1973 |
| JP | S60133808 U | 9/1985 |
| JP | H05068920 U | 9/1993 |
| JP | H07206115 A | 8/1995 |
| JP | 3674912 B2 | 7/2005 |
| WO | WO2005061363 A2 | 7/2005 |

OTHER PUBLICATIONS

International Search Report.
Extended European Search Report of the parallel application EP20748101.1.
First Office Actio of the parallel application JP2021-544672.
Reconsideration Report of the parallel application JP2021-544672.

* cited by examiner

HANDLING ROBOT AND HANDLING ASSEMBLY THEREOF

CROSS-REFERENCE TO RELATED DISCLOSURE

This application is a continuation of International Application No. PCT/CN2020/073623, filed on Jan. 21, 2020, which claims priority to Chinese Patent Application No. 201920182152.6, filed on Jan. 31, 2019. The disclosures of the aforementioned applications are hereby incorporated by reference in their entireties.

TECHNICAL FIELD

The present application relates to the field of intelligent warehousing and, in particular, to a handling robot and a handling assembly thereof.

BACKGROUND

Intelligent warehousing is a link in a logistics process, and the application of the intelligent warehousing ensures speed and accuracy of data input in all links of material warehouse management, ensuring that an enterprise accurately grasps real data of stock in time, and reasonably maintaining and controlling the stock of the enterprise.

A handling assembly plays an important role in the intelligent warehousing. The handling assembly handles materials instead of labour. However, in a process of implementing the present application, the inventor found that, warehousing robots currently equipped with shelves finished a holding and fetching action by handling assemblies extending from two sides of a material box and hooking back the material box, causing that the shelves need to reserve enough working space for the handling assembly, which reduces storage density of the warehouse.

SUMMARY

The main technical problem to be solved by embodiments of the present application is to provide a handling robot and a handling assembly thereof, which can improve storage density of warehousing.

In order to solve the above technical problem, the embodiments of the present application provide the following technical solutions.

Provided is a handling assembly, including a base component, a handling arm component, a hook and a driving component. The handling arm component is slidably mounted to the base component, and may perform a reciprocating linear movement relative to the base component. The hook is slidably mounted to the handling arm component, and may perform a reciprocating linear movement relative to the handling arm component. The hook is used for hooking or pushing a material. The driving component is connected with the handling arm component for driving the handling arm component and the hook to perform a reciprocating linear movement.

Preferably, the hook includes a connection portion and a hooking and pushing portion. The hooking and pushing portion is connected to the connection portion, and the hooking and pushing portion and the connection portion are at a preset angle. The hooking and pushing portion is used for hooking and pushing a material box, and the connection portion is slidably mounted to the handling arm component.

Preferably, the hooking and pushing portion is perpendicular to a movement direction in which the hook performs the reciprocating linear movement relative to the handling arm component.

Preferably, the connection portion and the hooking and pushing portion are disposed vertically.

Preferably, the hook is in an L-shaped structure or a ⊥-shaped structure or a ⌐-shaped structure.

Preferably, the handling arm component includes a handling plate and a transmission component. The handling plate is slidably mounted to the base component, and may perform a reciprocating linear movement on the base component. The hook is mounted to the handling plate, and may perform the reciprocating linear movement on the handling plate. The transmission component connects the base component and the hook, and the transmission component is used for driving the hook to perform the reciprocating linear movement on the handling plate.

Preferably, the base component includes a base main body and a first sliding rail. The first sliding rail is mounted to the base main body. The handling arm component further includes a first sliding chute, the first sliding chute is mounted to the handling plate and is slidably connected to the first sliding rail, and the handling plate may slide along the first sliding rail through the first sliding chute.

Preferably, the handling assembly includes a hooking component, and the hooking component includes a sliding block and the hook. The handling arm component further includes a second sliding rail, and the second sliding rail is mounted to the handling plate. The sliding block is mounted to the hook, and is slidably connected to the second sliding rail, and the hook may slide along the second sliding rail by the sliding block.

Preferably, the transmission component includes two movable pulleys and two strops. Each of the movable pulleys is mounted to the handling plate, and each of the strops is wound around a corresponding one of the movable pulleys. One end of each of the strops is connected to the hook, and the other end is connected to the base component.

Preferably, the hooking component further includes pressing plates. Two pressing plates are both mounted to the hook, and one end of each of the strops is connected to the hook by a corresponding one of the pressing plates.

Preferably, the movable pulley is a flat belt pulley, and the strop is an open-loop flat belt.

Preferably, a slot which is recessed for a component to slide therein is disposed in the middle of the handling plate. The hooking component, the second sliding rail and the transmission component are all mounted to the slot.

Preferably, the handling plate further includes side baffles. Two side baffles are respectively connected to two sides of the handling plate, and the two side baffles are used for correcting a posture of the material box when bearded by the handling plate, while preventing the material box from sliding off the handling plate.

Preferably, the handling plate further includes a guide plate. The guide plate is connected to a distal end of the handling plate, and is disposed at a preset included angle with the handling plate, and the guide plate is used for guiding when the material box is pulled onto the handling plate.

Preferably, the guide plate includes a first guide plate and a second guide plate. The first guide plate is disposed at an included angle in a horizontal direction with the handling plate, and is connected to the distal end of the handling plate, for guiding in the horizontal direction when the material box is pulled onto the handling plate. Two second guide plates are respectively disposed at an included angle in a vertical direction with two sides of the handling plate, and are respectively fixedly connected to distal ends of two sides of the handling plate, for guiding in the vertical direction when the material box is pulled onto the handling plate.

Preferably, the driving component includes a first driving device, a lead screw and a moving block. The first driving device and the lead screw are both mounted to the base component. An output end of the first driving device is connected with the lead screw. The moving block is mounted to the handling arm component, and the moving block is in a threaded connection with the lead screw. The first driving device is used for driving the lead screw to rotate relative to the base component, so that the moving block moves along the lead screw relative to the base component, to drive the handling arm component to perform a reciprocating linear movement relative to the base component.

Preferably, the base component includes a base main body and a bearing plate. The bearing plate is fixedly connected to a side of the base main body. The handling arm component is slidably mounted to a side of the bearing plate facing the base main body, and the handling arm component may perform a reciprocating linear movement relative to the bearing plate. The hook is slidably mounted to the handling arm component, and the hook may perform a reciprocating linear movement relative to the handling arm component.

In some embodiments, the handling assembly includes a plurality of sets of the handling arm components. The plurality of sets of the handling arm components are stacked in parallel with each other, and every two adjacent sets of the handling arm components are slidably connected to each other, and may perform a reciprocating linear movement relative to each other. A set of the handling arm components at an upper end of the plurality of sets of the handling arm components is slidably mounted to a side of the bearing plate facing the base main body, and may perform a reciprocating linear movement relative to the bearing plate. The hook is slidably mounted to a set of the handling arm components at a lower end of the plurality of sets of the handling arm components, and the hook may perform a reciprocating linear movement relative to the handling arm component.

Preferably, the handling assembly further includes a rotation component. The rotation component is connected to the base component, for driving the base component to perform a rotation movement.

Preferably, the rotation component includes a mounting bracket, a rotation mechanism and a rotation driving component. The rotation mechanism connects the mounting bracket and the base component, and the rotation mechanism may rotate around a rotation axis thereof, and the rotation driving component is connected to the rotation mechanism, for driving the rotation mechanism to rotate around the rotation axis.

Preferably, the rotation mechanism includes a slewing bearing, a circular light pulley and a connection plate. The slewing bearing includes an inner ring and an outer ring. The outer ring is sleeved on the inner ring, the outer ring is mounted to the mounting bracket, and the inner ring may rotate around the rotation axis relative to the outer ring. The connection plate is connected to the inner ring, and may rotate around the rotation axis with the inner ring. The circular light pulley is sleeved on the outer ring, and is mounted to the mounting bracket. The base component is mounted to the connection plate. The rotation driving component connects the connection plate and the circular light pulley, and is used for driving the connection plate to rotate around the rotation axis relative to the circular light pulley.

Preferably, the rotation driving component includes a second driving device, a second synchronous belt pulley and a second synchronous belt. The second driving device is connected to the connection plate. The second synchronous belt pulley is connected to an output end of the second driving device. One end of the second synchronous belt is sleeved on the second synchronous belt pulley, and the other end is sleeved on the circular light pulley.

Preferably, the rotation component further includes a rotation controlling component, the rotation controlling component is used for controlling the rotation mechanism to rotate around the rotation axis by the rotation driving component.

Preferably, the rotation component further includes a rotation caging device, and the rotation caging device is used for controlling the rotation mechanism to rotate around the rotation axis in a preset angle range.

In order to solve the above technical problem, the embodiment of the present application further provides the following technical solutions.

Provided is a handling robot, where the handling robot includes a mobile chassis, a storage shelf, a lifting device and the handling assembly as described above. The lifting device is mounted to the storage shelf. The handling assembly is mounted to the lifting device, and the lifting device is used for controlling the level of the handling assembly.

Advantageous effects of the implementations of the present application lie in: different from the prior art, in the handling robot and the handling assembly thereof of the embodiments of the present application, the handling assembly includes a hook, the handling arm component is slidably mounted to the base component, and the handling arm component may perform a reciprocating linear movement on the base component. The hook is slidably mounted to the handling arm component, the hook may perform a reciprocating linear movement on the handling arm component, and the hook slides toward the distal end of the handling arm component while the handling arm component slides off the base component, so that the hook hooks the bottom or the top of the material box, to realize pulling or pushing the material box without extending into two sides of the material box, thereby saving working space of the handling assembly, enabling the material boxes of the warehousing to be placed next to each other, and improving the storage density of the warehouse.

BRIEF DESCRIPTION OF DRAWINGS

One or more embodiments are exemplified by figures in the drawings corresponding to the embodiments. These exemplary descriptions do not constitute limitations on the embodiments. Elements with the same reference numerals in the drawings represent similar elements. Figures in the drawings are not drawn to scale unless particularly stated.

DESCRIPTION OF EMBODIMENTS

In order to facilitate understanding of the present application, the present application will be described in more detail below in conjunction with the drawings and specific implementations. It should be noted that when an element is expressed as being "fixed to" another element, it may be directly on the other element, or there may be one or more intervening elements therebetween. When an element is expressed as being "connected" to another element, it may be directly connected to the other element, or there may be one or more intervening elements therebetween. The terms "vertical", "horizontal", "left", "right" and similar expressions used in this specification are for illustrative purposes only.

Unless otherwise defined, all technical and scientific terms used in this specification have the same meaning as commonly understood by those skilled in the art of the present application. Terms used in the specification of the present application are only for the purpose of describing specific implementations rather than limiting the present application. The term "and/or" used in this specification includes any and all combinations of one or more related listed items.

Figure 1:
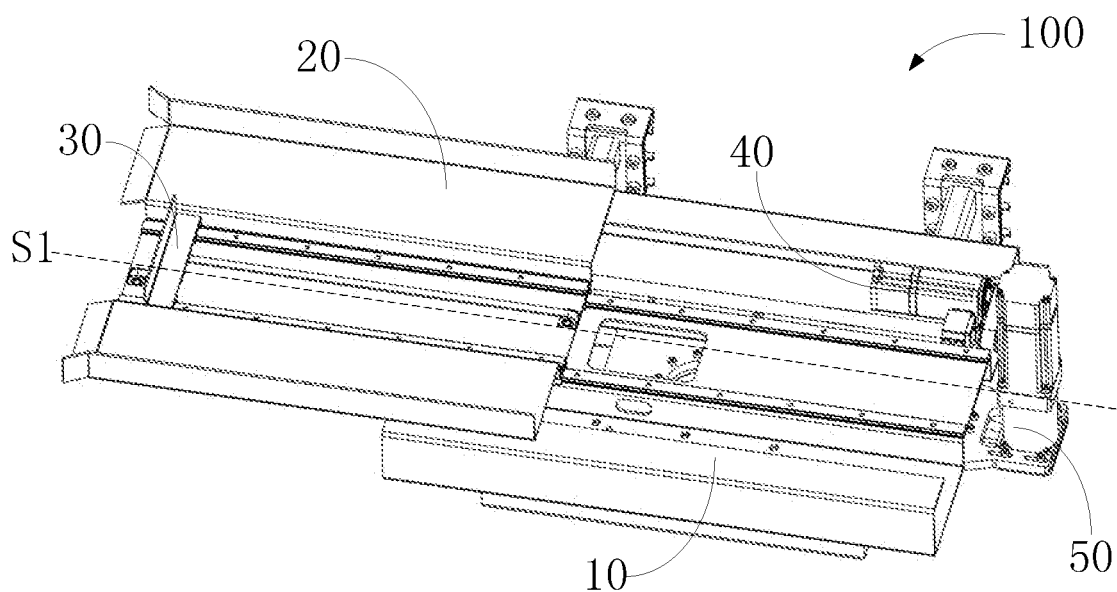
FIG. 1 is a schematic structural diagram of a handling assembly provided by an embodiment of the present application.
Figure 2:
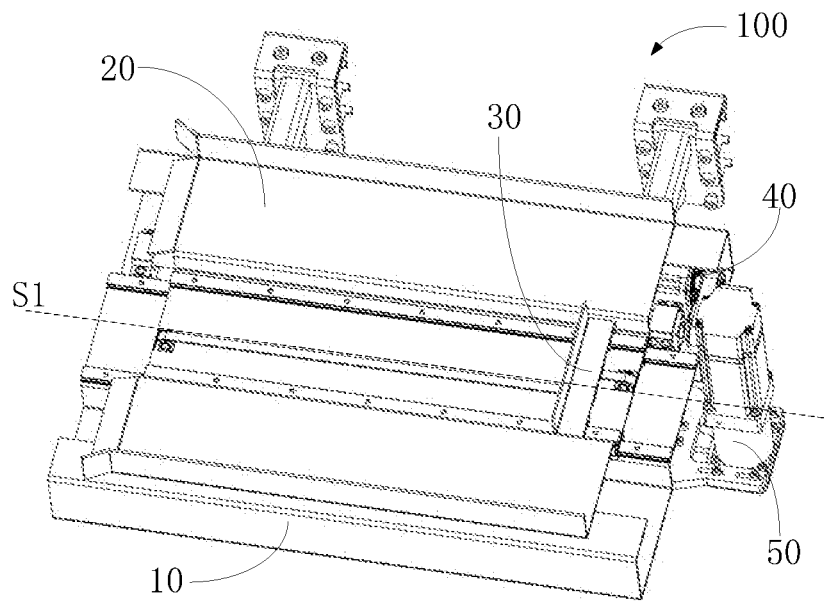
FIG. 2 is a schematic diagram of another state of the handling assembly shown in FIG. 1.

Please refer to FIGS. 1 and 2, one embodiment of the present application provides a handling assembly 100, and the handling assembly 100 may be applied to an intelligent warehousing system, an intelligent logistics system or an intelligent sorting system and the like. In particular, the handling assembly 100 may be mounted to a handling robot or a handling device to realize its function of handling materials.

The handling assembly 100 includes a base component 10, a handling arm component 20, a hooking component 30, a driving component 40 and a rotation component 50. Where the base component 10 has a reference line set horizontally, the handling arm component 20 is slidably mounted to the base component 10, and may perform a reciprocating linear movement along the reference line with respect to the base component 10; the hooking component 30 is slidably mounted to the handling arm component 20, and may perform a reciprocating linear movement along the reference line with respect to the handling arm component 20; the driving component 40 is connected with the handling arm component 20, the driving component 40 is used for driving the handling arm component 20 to perform a reciprocating linear movement along the reference line with respect to the base component 10, and meanwhile, the handling arm component 20 drives the hooking component 30 to perform a reciprocating linear movement along the reference line with respect to the handling arm component 20; and the rotation component 50 connects to the handling assembly 100 and the handling robot or the handling device, and the rotation component 50 is used for rotating the handling assembly 100 to a desired angle.

Figure 3:
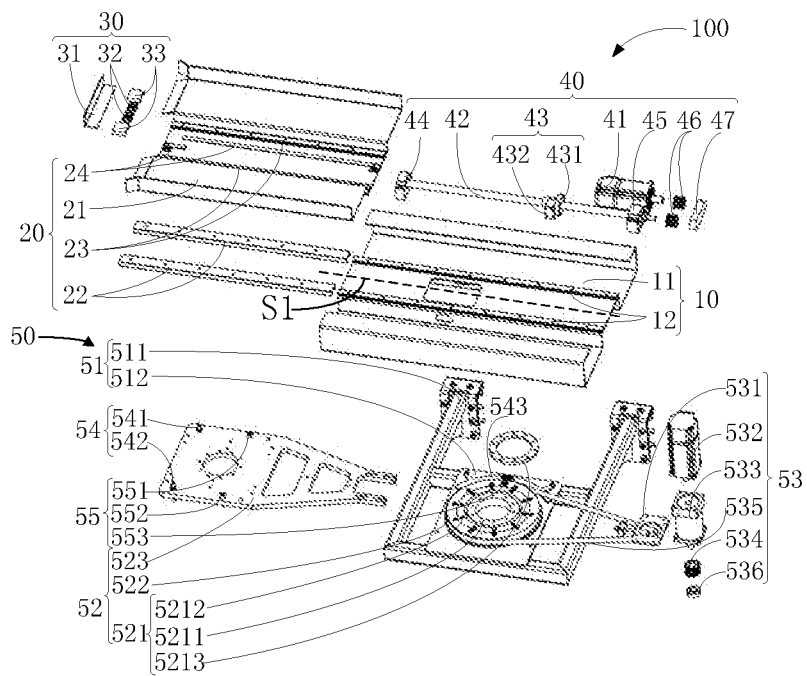
FIG. 3 is a schematic exploded structural diagram of the handling assembly shown in FIG. 1.

Please refer to FIG. 3, the base component 10 includes a base main body 11 and first sliding rails 12. The base main body 11 is disposed horizontally, and has a first reference line S1 disposed horizontally, the first reference line S1 is the horizontally disposed reference line of the base component 10, and the first reference line S1 coincides with a center line of the base main body 11. Two first sliding rails 12 are symmetrically disposed on two sides of the first reference line S1 with the first reference line S1 as a guide, and are both mounted to a side of the base main body 11 facing away the ground.

It may be understood that, in some other embodiments, according to an actual situation, the base main body 11 may also be disposed at a preset included angle with a horizontal plane, as long as a function of the handling assembly 100 hooking or pushing a material box from a top or a bottom thereof can be realized.

Figure 4:
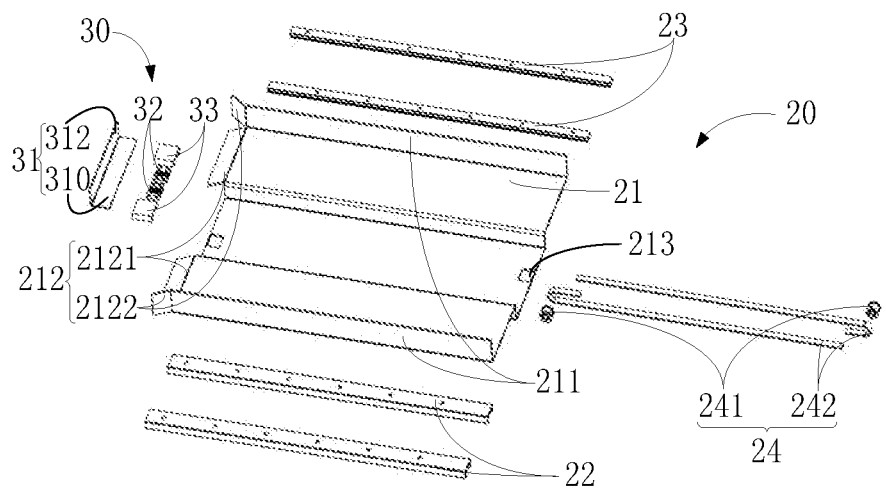
FIG. 4 is a schematic structural diagram of a handling arm component and a hooking component of the handling assembly shown in FIG. 1.
Figure 5:
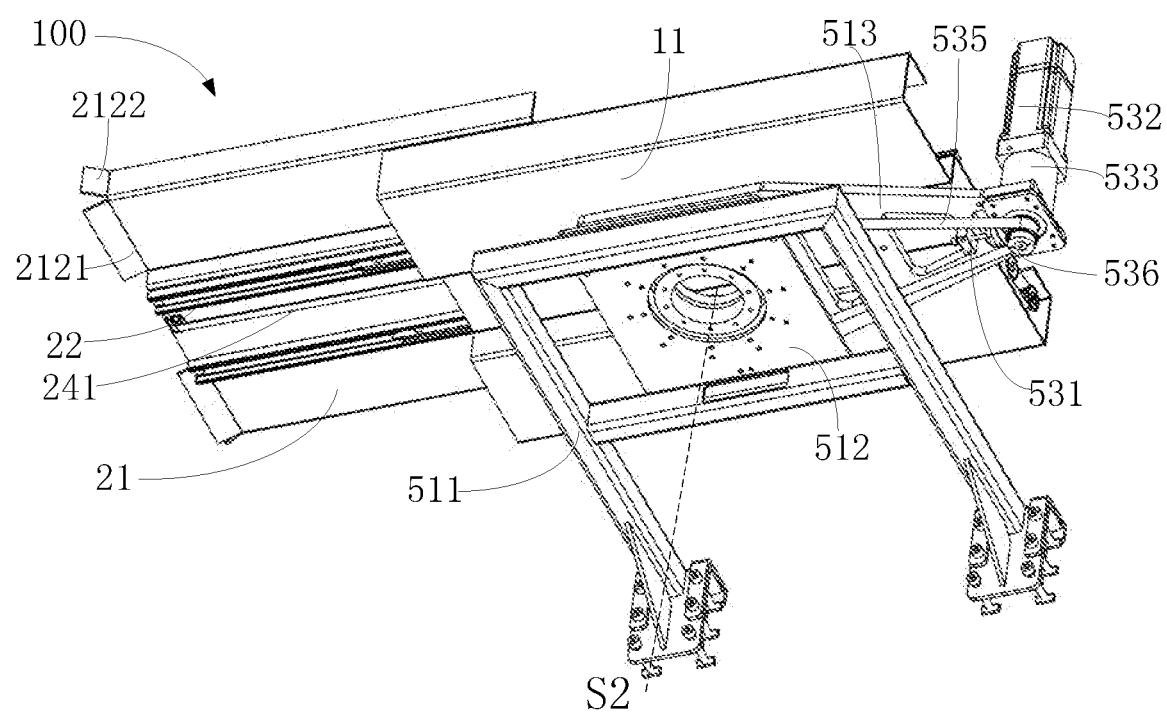
FIG. 5 is a schematic structural diagram of the handling assembly shown in FIG. 1 from another angle.

Please refer to FIGS. 4 and 5 together, the handling arm component 20 includes a handling plate 21, sliding chutes 22, second sliding rails 23 and transmission components 24. Where the sliding chutes 22, the second sliding rails 23 and the transmission components 24 are all mounted to the handling plate 21, the transmission components 24 connect with the base main body 11 and the hook 31, and the transmission components 24 are used for driving the hook 31 to perform a reciprocating linear movement on the handling plate 21.

A slot is disposed in the middle of the handling plate 21 with the first reference line S1 as a guide, and the second sliding rails 23, the transmission components 24 and the hooking component 30 are all mounted to the slot. The handling plate 21 is slidably mounted to the base main body 11, and the handling plate 21 is used for bearing the material box.

Two sliding chutes 22 are symmetrically disposed on two sides of the first reference line S1 with the first reference line S1 as a guide, and are both mounted to a side of the handling plate 21 facing the base main body 11. Each of the sliding chutes 22 is slidably connected to a corresponding one of the first sliding rails 12, and the sliding chutes 22 may slide along the first sliding rail 12 to drive the handling plate 21 to perform a reciprocating linear movement along the first reference line S1 with respect to the base main body 11.

Two second sliding rails 23 are symmetrically disposed on two sides of the first reference line S1 with the first reference line S1 as a guide, and are both mounted to the slot of the handling plate 21.

The hooking component 30 includes a hook 31, pressing plates 32 and sliding blocks 33. Where the pressing plates 32 and the sliding blocks 33 are both mounted to the hook 31.

The hook 31 is used for hooking the material box fixed on a shelf, or pushing the material box on the handling plate 21. The hook 31 includes a connection portion 310 and a hooking and pushing portion 312, where the hooking and pushing portion 312 is connected to the connection portion 310, and the hooking and pushing portion 312 and the connection portion 310 are at a preset angle. The hooking and pushing portion 312 is used for hooking the material box fixed on the shelf, or pushing the material box on the handling plate 21. In the present embodiment, the hooking and pushing portion 312 is perpendicular to the connection portion 310, and the hooking and pushing portion 312 is perpendicular to a movement direction in which the hook 31 performs a reciprocating linear movement with respect to the handling plate 21.

Two sliding blocks 33 are symmetrically disposed on two sides of the first reference line S1 with the first reference line S1 as a guide, and are both mounted to the connection portion 310. Two pressing plates 32 are symmetrically disposed on two sides of the first reference line S1 with the first reference line S1 as a guide, and are both mounted to the connection portion 310. Each of the sliding blocks 33 is slidably mounted to a corresponding one of the second sliding rails 23, and the sliding blocks 33 may slide along the second sliding rails 23 to drive the hook 31 to perform a reciprocating linear movement along the first reference line S1 with respect to the handling plate 21.

In the present embodiment, the hook 31 is in an L-shaped structure, the connection portion 310 is a bottom of the L-shaped structure, and the hooking and pushing portion 312 is a side of the L-shaped structure. It may be understood that, according to an actual situation, the hook 31 is not limited to the L-shaped structure, and the hook 31 may also be other structures with a hooking and pushing function, for example, the hook 31 may be in a ⊔-shaped structure, the connection portion 310 is a bottom of the middle of the ⊔-shaped structure, the hooking and pushing portion 312 is two sides of the ⊔-shaped structure, or, the hook 31 may be in a ⊥-shaped structure and the like.

It may be understood that, according to an actual situation, the number of the first sliding rail 12 or the second sliding rail 23 is not limited to two, for example, the number of the first sliding rail 12 may be one, three or more than three, as long as it is at least one, and the number of the second sliding rail 23 may be one, three or more than three, as long as it is at least one. Correspondingly, the number of the sliding chute 22 is the same as the number of the first sliding rail 12, and the number of the sliding block 33 is the same as the number of the second sliding rail 23.

Two sets of the transmission components 24 are disposed on two sides of the first reference line S1 with the first reference line S1 as a guide, and are both mounted to the slot of the handling plate 21. Each set of the transmission components 24 connect with the base main body 11 and the hooking component 30, and the transmission components 24 are used for driving the hooking component 30 to move relative to the handling plate 21 when the handling plate 21 moves along the first reference line S1 relative to the base main body 11.

Each set of the transmission components 24 include a movable pulley 241 and a strop 242. Front and rear ends of the handling plate 21 are respectively provided with an opening 213, each of the movable pulleys 241 is mounted to a corresponding opening 213, each of the movable pulleys 241 can rotate around its own central axis. Each strop 242 passes through a corresponding opening 213, and is wound around a corresponding movable pulley 241. One end of each strop 242 is fixedly connected to the base main body 11, and the other end is fixedly connected to a pressing plate 32 corresponding to the hooking component 30. When the handling plate 21 slides at a first speed along the first reference line S1 relative to the base main body 11, and the hooking component 30 moves at a second speed along the first reference line S1 relative to the handling plate 21 under the pull of the strop 242, where the second speed is twice the first speed. Where the handling plate 21 and the base main body 11 moves relative to each other, so that the strop 242 of one set of the transmission components 24 pulls the hooking component 30 to move by winding around a corresponding movable pulley 241, and meanwhile, the hooking component 30 tensions the strop 242 of another set of transmission components 24 during movement, and rotation directions of the two movable pulleys 241 are always the same.

In the present embodiment, the movable pulley 241 is a flat belt pulley, and the strop 242 is an open-loop flat belt.

It may be understood that, according to an actual situation, the movable pulley 241 is not limited to the flat belt pulley, and the strop 242 is not limited to the open-loop flat belt. For example, the movable pulley 241 and the strop 242 are respectively a sprocket and a link chain, and for another example, the movable pulley 241 and the strop 242 are respectively a V-belt pulley and a V-belt and the like. Of course, the transmission component 24 is not limited to the belt transmission mechanism of the movable pulley 241 and the strop 242, and the transmission component 24 may also be a transmission mechanism of a gear rack or a transmission mechanism of a worm gear and the like.

Please continue to refer to FIG. 4, the handling plate 21 further includes a side baffle 211 and a guide plate 212.

Two side baffles 211 are respectively fixedly connected to two sides of the handling plate 21, and the two side baffles 211 are used for correcting the posture of the material box when it is carried on the handling plate 21, while preventing the material box from sliding down from the handling plate 21.

The guide plate 212 includes first guide plates 2121 and second guide plates 2122, and the first guide plates 2121 and the second guide plates 2122 are all mounted at the distal end of the handling plate 21.

Two first guide plates 2121 are disposed at a preset included angle in a horizontal direction with the handling plate 21, and are respectively fixedly connected to two sides of the distal end of the handling plate 21. The first guide plates 2121 are used for guiding in a vertical direction when the material box is pulled on the handling plate 21. The two second guide plates 2122 are respectively disposed at a preset included angle in the vertical direction with the two side baffles 211, and are respectively fixedly connected to the distal ends of the two side baffles 211. The two second guide plates 2122 are used for guiding in the horizontal direction when the material box is pulled on the handling plate 21. By disposing the first guide plates 2121 and the second guide plates 2122 on the handling plate 21, the handling assembly 100 can smoothly hook the material box at the bottom of the material box and from the fixed shelf to the handling plate 21, thereby preventing failure of the hooking even damage to the material box or the handling plate 21 due to a mismatch between a protruding angle of the handling plate 21 of the handling assembly 100 and a placement position of the material box.

Please continue to refer to FIG. 3, the driving component 40 includes a first driving device 41, a lead screw 42 and a moving block 43. The first driving device 41 and the lead screw 42 are both mounted to the base main body 11, an output end of the first driving device 41 is connected with the lead screw 42, and a center line of the lead screw 42 is disposed in parallel with the first reference line S1. The moving block 43 is mounted to the handling plate 21, and the moving block 43 is in a threaded connection with the lead screw 42. The first driving device 41 is used for driving the first lead screw 42 to rotate around the center line relative to the base main body 11, so that the first moving block 43 moves along the first reference line S1 relative to the base main body 11 to drive the handling arm component 20 to perform a reciprocating linear movement along the first reference line S1 relative to the base main body 11.

In particular, a lead screw supporting seat 44 and a screw fixing seat 45 are disposed on the base main body 11, and the screw supporting seat 44 and the screw fixing seat 45 are oppositely disposed on both ends of the base main body 11. Both ends of the screw 42 are respectively mounted to the screw supporting seat 44 and the screw fixing seat 45, and one end of the screw 42 passes through the screw fixing seat 45. The moving block 43 includes a screw nut 431 and a screw connection block 432, the screw nut 431 is in a threaded connection with the screw 42, the screw connection block 432 is fixedly connected to the screw nut 431, and the screw connection block 432 is mounted to the handling plate 21. The first driving device 41 is disposed at one side of the screw fixing seat 45, and a central axis of the first driving device 41 is disposed in parallel with the center line of the screw 42. The output end of the first driving device 41 and one end of the and the screw 42 passing through the screw fixing seat 45 are respectively disposed with a first synchronous belt pulley 46. Two first synchronous belt pulleys 46 are connected by a first synchronous belt 47, one end of the first synchronous belt 47 is sleeved on the first synchronous belt pulley 46 at the output end of the first driving device 41, the other end of the first synchronous belt 47 is sleeved on the first synchronous belt pulley 46 at one end of the screw fixing seat 45, so that the screw 42 rotates synchronously by the power transmitted through the first synchronous belt 47 when the output end of the first driving device 41 rotates, and meanwhile, the moving block 43 may move back and forth along the screw 42 according to the change of a rotating direction of the screw 42, thereby driving the handling plate 21 to perform a reciprocating linear movement along the first reference line S1.

It may be understood that, according to an actual situation, the first synchronous belt pulley 46 and the first synchronous belt 47 may also respectively be a sprocket and a link chain, or, the first synchronous belt pulley 46 and the first synchronous belt 47 may also respectively be a V-belt pulley and a V-belt and the like.

In the present embodiment, the first driving device 41 is a first servo motor. It may be understood that, according to an actual situation, the first driving device 41 is not limited to the servo motor, for example, the first driving device 41 is a pneumatic motor, while the driving component 40 may be a hydraulic power system and the like.

It may be understood that, the transmission mechanism between the first driving device 41 and the handling plate 21 is not limited to a combination of the lead screw 42 and the moving block 43, and the transmission mechanism between the first driving device 41 and the handling plate 21 may also be a gear rack or a worm gear and the like.

In some other embodiments, the first driving device 41 is mounted to the handling plate 21 to drive the handling plate 21 to perform a reciprocating linear movement along the first reference line S1 relative to the base main body 11 by a transmission mechanism such as a gear rack or a worm gear or a lead screw and so on.

In some other embodiments, the first driving device 41 drives the hooking component 30 to perform a reciprocating linear movement along the first reference line S1 relative to the handling plate 21 through a transmission mechanism, and the hooking component 30 drives the handling plate 21 to perform a reciprocating linear movement along the first reference line S1 through the other transmission mechanism during the movement.

Figure 6:
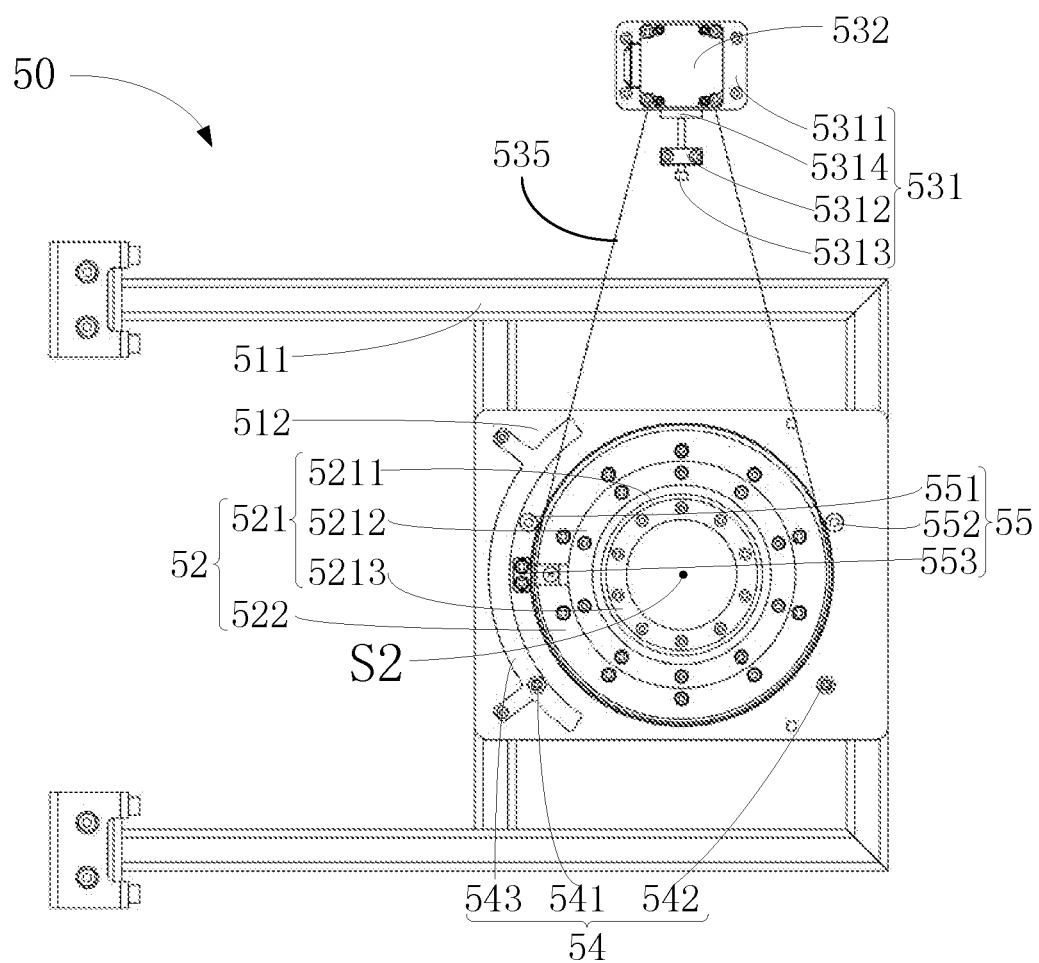
FIG. 6 is a schematic structural diagram of a rotation component of the handling assembly shown in FIG. 1, in which a connection plate of the rotation component is omitted.

Please refer to FIGS. 3, 5 and 6, the rotation component 50 is used for enabling the handling assembly 100 to rotate relative to the handling robot or the handling device. The rotation component 50 includes a mounting bracket 51, a rotation mechanism 52, a rotation driving component 53, a rotation controlling component 54 and a rotation caging device 55. Where the rotation mechanism 52 connects the base main body 11 and the mounting bracket 51, the rotation mechanism 52 may rotates around a rotation axis S2 thereof, the rotation axis S2 is vertically disposed, the rotation driving component 53 is connected to the rotation mechanism 52, the rotation driving component 53 is used for driving the rotation mechanism 52 to rotate around the rotation axis S2, the rotation controlling component 54 is used for controlling the rotation mechanism 52 to rotate around the rotation axis S2 by the rotation driving component 53, and the rotation caging device 55 is used for limiting the rotation driving component 53 to rotate in a preset angle range.

The mounting bracket 51 is used for bearing the base component 10, the handling arm component 20, the hooking component 30, the driving component 40, the rotation mechanism 52, the rotation driving component 53, the rotation controlling component 54 and rotation caging device 55. The mounting bracket 51 includes a bracket body 511 and a mounting plate 512. The bracket body 511 is used for being mounted to the handling robot or the handling device, and the mounting plate 512 is mounted to the bracket body 511.

The rotation mechanism 52 includes a first rotation member 521, a second rotation member 522 and a connection plate 523. The first rotation member 521 is mounted to a side of the mounting plate 512 facing the base main body 11, the rotation axis S2 coincides with a center line of the first rotation member 521, the second rotation member 522 is sleeved on the first rotation member 521 and is mounted to the side of the mounting plate 512 facing the base main body 11, an axis of the first rotation member 521 coincides with an axis of the second rotation member 522, and the axis is the rotation axis S2 of the rotation mechanism 52. The first rotation member 521 may rotate around the rotation axis S2 relative to the second rotation member 522. The connection plate 523 connects the second rotation member 522 and the base main body 11, and the connection plate 523 and the base main body 11 may rotate around the rotation axis S2 with the second rotation member 522.

In the present embodiment, the first rotation member 521 is a slewing bearing, and the second rotation member 522 is a circular light pulley. The slewing bearing includes an inner ring 5211 and an outer ring 5212. The outer ring 5212 is sleeved on the inner ring 5211 and is mounted to the mounting plate 512, the circular light pulley is sleeved on the outer ring 5212 and is mounted to the mounting plate 512, and the inner ring 5211 may rotate around the rotation axis S2 relative to the outer ring 5212. A gasket 5213 is disposed on the inner ring 5211, the gasket 5213 is mounted to a side of the inner ring 5211 facing the base main body 11, and the gasket 5213 may rotate around the rotation axis S2 relative to the outer ring 5212 with the inner ring 5211. One side of the connection plate 523 is mounted to the gasket 5213, a bottom surface of the base main body 11 is mounted to the other side of the connection plate 523, and the connection plate 523 may rotate around the rotation axis S2 relative to the mounting plate 512 with the gasket 5213. Correspondingly, the base component 10, the handling arm component 20, the hooking component 30 and the driving component 40 may all rotate around the rotation axis S2 relative to the mounting plate 512 with the connection plate 523.

The rotation driving component 53 includes a tension device 531, a second driving device 532, a retarder 533, a second synchronous belt pulley 534 and a second synchronous belt 535.

The tension device 531 includes a fixing seat 5311, a tension block 5312 and a screw 5313. The fixing seat 5311 is mounted to one end of the connection plate 523 facing away from the rotation axis S2, a flange 5314 is disposed at a side of the fixing seat 5311 with respect to the rotation axis S2, and the flange 5314 and the fixing seat 5311 are fixedly connected. The tension block 5312 is oppositely disposed with the flange 5314, and is mounted to the connection plate 523. The screw 5313 is in a threaded connection with the tension block 5312, the screw 5313 passes through the tension block 5312, and one end of the screw 5313 abuts on the flange 5314.

The retarder 533 is mounted to the fixing seat 5311, the second driving device 532 is mounted to the retarder 533, and the output end of the second driving device 532 is connected with an input end of the retarder 533. The retarder 533 is used for reducing the rotation speed of the output end of the second driving device 532, while increasing output torque.

The second synchronous belt pulley 534 is mounted to the output end of the retarder 533, where one end of the second synchronous belt 535 is sleeved on the second synchronous belt pulley 534, and the other end is sleeved on the circular light pulley. The output end of the retarder 533 is further provided with a fixing ring 536, and the fixing ring 536 is used for preventing an axial movement of the second synchronous belt pulley 534. When the second synchronous belt 535 connected between the second synchronous belt pulley 534 and the second rotation member 522 is slack, the screw 5313 may be rotated to enable one end of the screw 5313 to abut toward a direction of the flange 5314, thereby realizing a function of tensioning the second synchronous belt 535.

In the present embodiment, the second driving device 532 is a second servo motor.

It may be understood that, according to an actual situation, the rotation driving component 53 may also be a pneumatic motor and the like. Of course, the transmission method of the second driving device 532 is not limited to the second synchronous belt pulley 534 and the second synchronous belt 535, and the second driving device 532 may also drive the rotation mechanism to rotate around the rotation axis S2 by the transmission mechanism of a gear rack or the transmission mechanism of a worm gear and so on.

Please continue to refer to FIG. 6, the rotation caging device 55 includes a first caging rod 551, a second caging rod 552 and a caging block 553. The first caging rod 551 and the second caging rod 552 are both mounted to the connection plate 523, and the first caging rod 551 and the second caging rod 552 are circumferentially distributed around the rotation axis S2, the caging block 553 is mounted to a bottom surface of the mounting plate 512 facing the connection plate 523, and the caging block 553 may respectively abut against the first caging rod 551 and the second caging rod 552, so that the rotation mechanism 52 may only rotate around the rotation axis S2 in a preset angle range.

The rotation controlling component 54 includes a first angle sensor 541, a second angle sensor 542 and a rotation controller. The first angle sensor 541 and the second angle sensor 542 are both mounted to the connection plate 523, and the first angle sensor 541 and second angle sensor 542 are circumferentially distributed around the rotation axis S2.

The rotation controller is connected with the rotation driving component 53, for controlling, through the rotation driving component 53, the rotation direction of the rotation mechanism 52 around the rotation axis S2.

In the present embodiment, the first angle sensor 541 is a first approaching switch, and the second angle sensor 542 is a second approaching switch.

The rotation controlling component 54 further includes a detecting plate 543, where the detecting plate 543 is mounted to a bottom surface of the mounting plate 512 facing the connection plate 523, and the detecting plate 543 is bent around the rotation axis S2.

When the connection plate 523 rotates to a preset angle, the first approaching switch 541 faces the detecting plate 543, and the second approaching switch 542 does not face the detecting plate 543; and when the connection plate 523 rotates to another preset angle, the first approaching switch 541 does not face the detecting plate 543, and the second approaching switch 542 faces the detecting plate 543.

Figure 7:
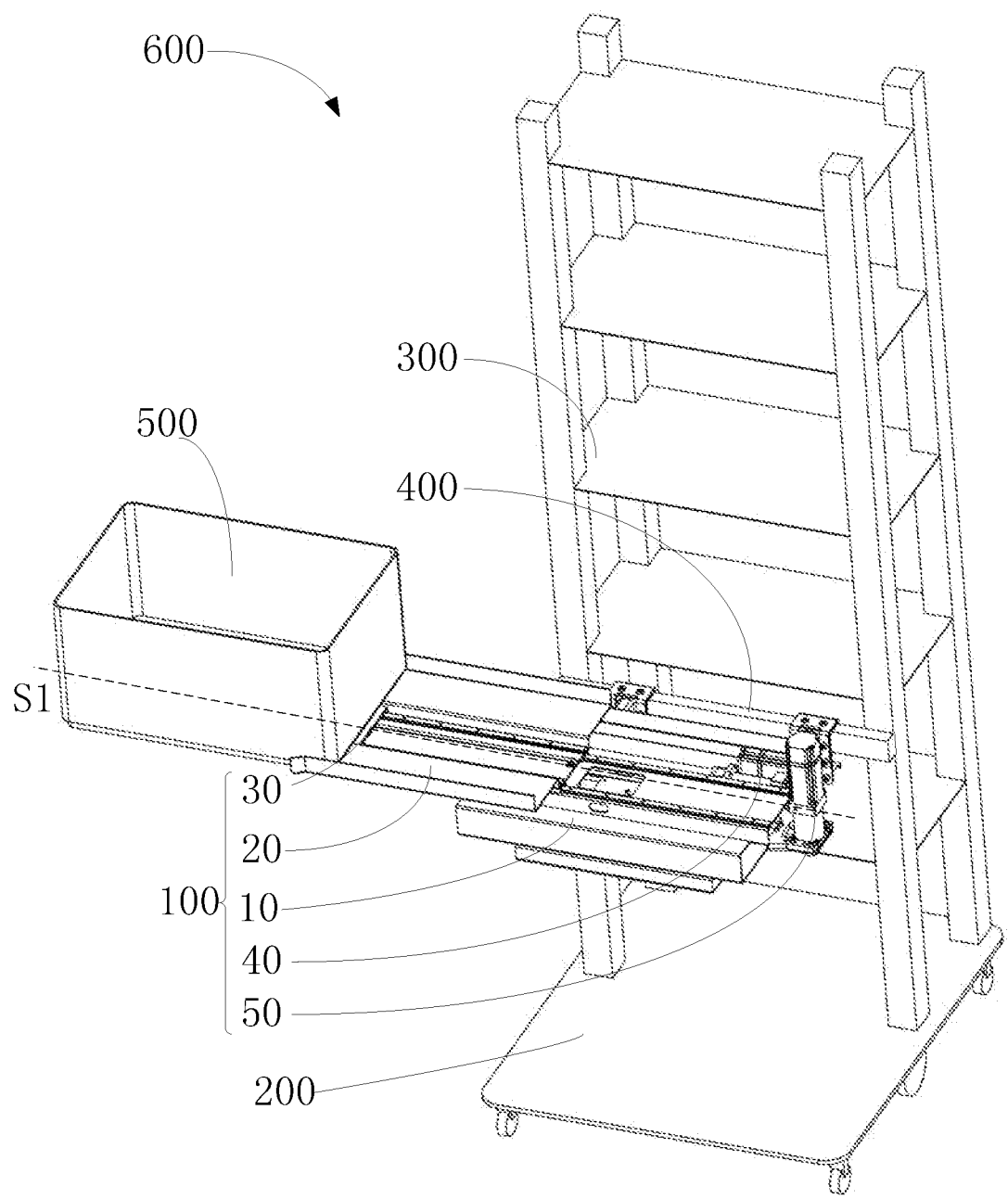
FIG. 7 is a schematic structural diagram of a handling robot provided by another embodiment of the present application.

Please refer to FIG. 7, another embodiment of the present application further provides a handling robot 600, which includes a mobile chassis 200, a storage shelf 300, a lifting device 400 and the handling assembly 100. The storage shelf 300 is mounted to the mobile chassis 200, the lifting device 400 is mounted to the storage shelf 300, a plurality of storage pallets are disposed on the storage shelf 300, the storage pallets are used for placing the material box 500, the handling assembly 100 is mounted to the lifting device 400 through the bracket body 511, the mobile chassis 200 is used for driving the handling robot 600 to a designated place, and the lifting device 400 is used for controlling the level of the handling assembly 100, so that the handling assembly 100 may place the material box 500 on the storage shelf 300 after fetching it from the fixed shelf. It should be noted that a chute to be hooked by the hook 31 is disposed at the bottom of the material box 500 to cooperate a hooking action of the handling assembly 100.

Steps for the handling robot 600 to fetch a material from the fixed shelf are as follows.

The first step, the handling robot 600 is moved to the fixed shelf where the material box 500 is placed along a designated path through the mobile chassis 200, and the mobile chassis 200 is stationary relative to the fixed shelf.

The second step, the handling assembly 100 is driven to move along the vertical direction relative to the fixed shelf through the lifting device 400, so that the handling arm component 20 of the handling assembly 100 is located on a horizontal plane at a preset distance from the bottom of the material box 500.

The third step, the handling assembly 100 is rotated around the rotation axis S2 through the rotation component 50, so that the protruding direction of the handling arm component 20 of the handling assembly 100 faces the front of the material box 500.

The fourth step, the handling arm component 20 protrudes along the first reference line S1 relative to the base main body 11, while driving the hooking component 30 to slide toward one end of the handling arm component 20.

Where the first driving device 41 drives, through the first synchronous belt 47, the screw 42 to synchronously rotate around the center line thereof in the first rotation direction, at the same time, the moving block 43 synchronously moves along the first horizontal direction relative to the screw 42, the moving block 43 drives the handling plate 21 to slide out along the first horizontal direction relative to the base main body 11, and the strop 242 of a set of the transmission components 24 pulls the hooking component 30 to slide to one end of the handling plate 21 along the first horizontal direction relative to the handling plate 21, so that the hook 31 of the hooking component 30 is located in the chute at the bottom of the material box 500. The first horizontal direction is parallel with the first reference line S1.

The fifth step, the handling assembly 100 is lifted by the lifting device 400, so that the hook 31 hooks the chute of the material box 500.

The sixth step, the handling arm component 20 retracts along the first reference line S1 relative to the base main body 11, while driving the hooking component 30 to slide toward the other end of the handling arm component 20, at the same time, the material box 500 is pulled onto the handling plate 21.

Where the first driving device 41 drives, through the first synchronous belt 47, the screw 42 to rotate synchronously in the second rotation direction, at the same time, the moving block 43 moves synchronously in the second horizontal direction relative to the screw 42, the moving block 43 drives the handling plate 21 to slide in the second horizontal direction relative to the base main body 11, and the strop 242 of another set of the transmission components 24 pulls the hooking component 30 to slide to the other end of the handling plate 21 along the second horizontal direction relative to the handling plate 21, so that the material box 500 is pulled onto the handling plate 21. The second horizontal direction is parallel with the first reference line S1, the first horizontal direction is opposite to the second horizontal direction, and the first rotation direction is opposite to second rotation direction.

The seventh step, the material box located on the handling plate 21 is pushed to one storage pallet on the storage shelf 300.

Where the handling assembly 100 is rotated around the rotation axis S2 by the rotation component 50, the level of the handling assembly 100 is adjusted through the lifting device 400 as required, so that the handling arm component 20 of the handling assembly 100 is opposite to one storage pallet on the storage shelf 300, and then the handling plate 21 is driven to slide out relative to the base main body 11, at the same time, the hook 31 slides toward one end of the handling plate 21 under the driving of one set of the transmission components 24, and the hook 31 pushes the material box 500 on the handling plate 21 to the storage pallet. The handling assembly 100 is lowered by the lifting device 400, so that the hook 31 is separated from the chute of the material box 500. And then the handling arm component 20 is driven to retract along the first reference line S1 relative to the base main body 11, at the same time, the hook 31 slides toward the other end of the handling plate 21 under the driving of another set of the transmission components 24.

In the present embodiment, the handling assembly 100 includes the base main body 11, the handling arm component 20, the hook 31 and the driving component 40. The handling arm component 20 is slidably mounted to the base main body 11 and may perform a reciprocating linear movement on the base main body 11, and the hook 31 is slidably mounted to the handling arm component 20 and may perform a reciprocating linear movement on the handling arm component 20. The driving component 40 is connected with the handling arm component 20 for driving the handling arm component 20 and the hook 31 to perform a reciprocating linear movement, so that the handling assembly 100 may pull and handle the material box 500 from the bottom of the front thereof without extending into two sides of the material box 500, thereby saving the working space of the handling assembly 100, enabling the material boxes 500 of the warehousing to be placed next to each other, and improving the storage density of the warehouse.

Figure 8:
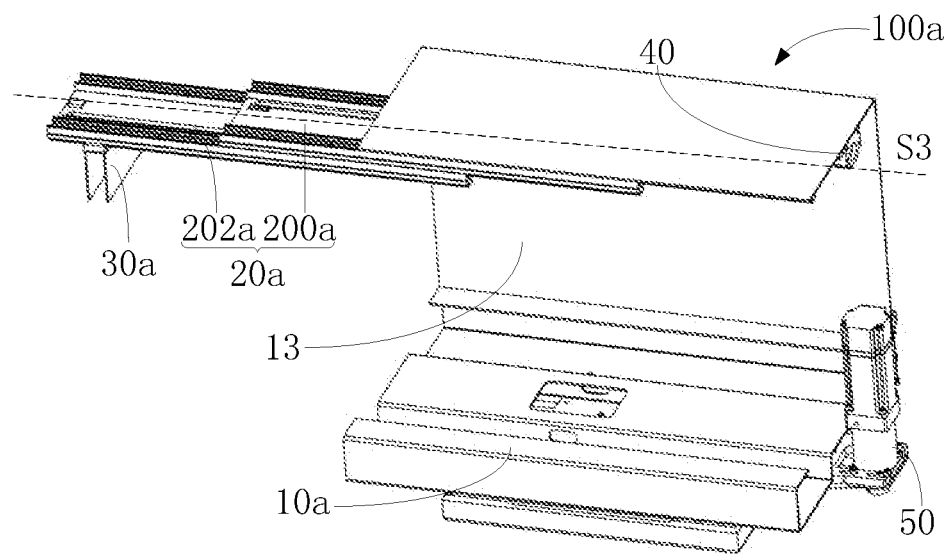
FIG. 8 is a schematic structural diagram of a handling assembly provided by yet another embodiment of the present application.
Figure 9:
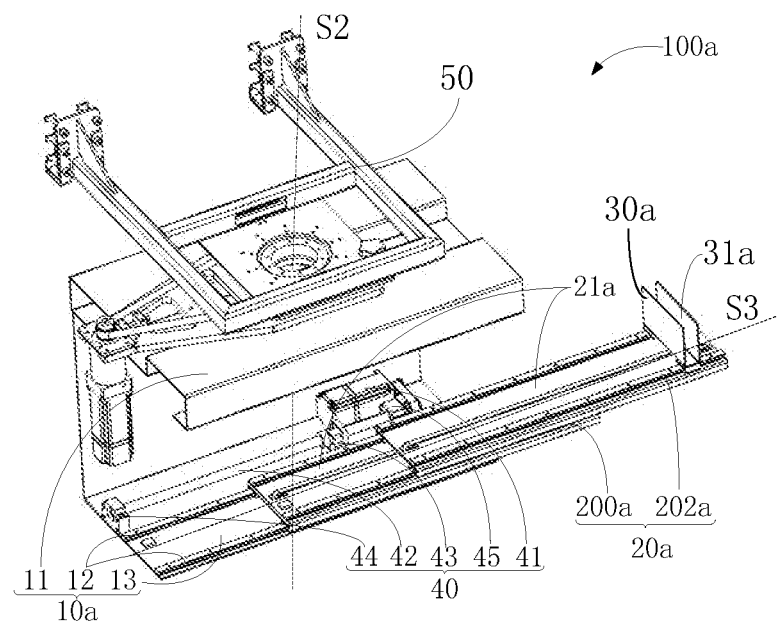
FIG. 9 is a schematic structural diagram of the handling assembly shown in FIG. 8 from another angle.

Please refer to FIG. 8 and FIG. 9, yet another embodiment of the present application provides a handling assembly 100a, which is substantially the same as the handling assembly 100 provided in the embodiment described above, and differences therebetween lie in: the handling assembly 100a is in a double-depth structure, and includes a base component 10a and a handling arm component 20a, the base component 10a includes the base main body 11, the first sliding rails 12 and a bearing plate 13, the bearing plate 13 is fixedly connected to one side of the base main body 11, and the first sliding rails 12 are mounted to a side of the bearing plate 13 facing the base main body 11. The handling arm component 20a includes a primary handling arm component 200a and a secondary handling arm component 202a, the primary handling arm component 200a is slidably mounted to the side of the bearing plate 13 facing the base main body 11, the primary handling arm component 200a may perform a reciprocating linear movement relative to the bearing plate 13, the secondary handling arm component 202a is slidably mounted to a side of the primary handling arm component 200a facing the base main body 11, and the secondary handling arm component 202a may perform a reciprocating linear movement relative to the primary handling arm component 200a; and the driving component 40 is mounted to the side of the bearing plate 13 facing the base main body 11, and is connected with the primary handling arm component 200a. In particular:

The base main body 11 is disposed horizontally, and the base main body 11 is used for bearing a material box 500a. The bearing plate 13 is fixedly connected to a side of the base main body 11, the bearing plate 13 has a second reference line S3 disposed horizontally, the reference line is the second reference line S3, the second reference line S3 is in the same vertical plane as a center line of the base main body 11 and is disposed in parallel with the center line of the base main body 11, and the primary handling arm component 200a and the secondary handling arm component 202a may both perform a reciprocating linear movement along the second reference line S3. Two first sliding rails 12 are symmetrically disposed on two sides of the second reference line S3 with the second reference line S3 as a guide, and are both mounted to a side of the bearing plate 13 facing the base main body 11.

The primary handling arm component 200a and the secondary handling arm component 202a are both substantially the same as the handling arm component 20 in the embodiment described above, and differences therebetween lie in: the handling plate 21a in this embodiment is a rectangular plate, that is, no slot is disposed in the middle of the handling plate 21a, no side baffle is disposed on two sides of the handling plate 21a, and no guide plate is disposed at the distal end of the handling plate 21a.

It may be understood that, in some other embodiments, on two sides of the base main body 11 are provided side baffle structures for correcting the posture of the material box 500a while preventing the material box 500a from sliding off the base main body 11, and the base main body 11 is provided with a guiding structure for guiding the material box 500a in the horizontal and vertical directions.

The primary handling arm component 200a and the secondary handling arm component 202a are disposed with the second reference line S3 as a guide.

Differences between the hooking component 30a and the hooking component 30 in the embodiment described above lie in: the hook 31a of the hooking component 30a in this embodiment is in a ⌴-shaped structure, the hook 31a is slidably mounted to a side of the secondary handling arm component 202a facing the base main body 11, and the notch of the hook 31a is downward.

The transmission component of the primary handling arm component 200a connects the bearing plate 13 and the secondary handling arm component 202a, and the transmission component of the secondary handling arm component 202a connects the primary handling arm component 200a and the hooking component 30a.

It may be understood that, in some other embodiments, the primary handling arm component 200a may be omitted, and the secondary handling arm component 202a is directly slidably mounted to the side the bearing plate 13 facing the base main body 11. Where the transmission component of the secondary handling arm component 202a connects the bearing plate 13 and the hooking component 30a.

It may be understood that, according to actual needs, the handling assembly 100a may be provided with multiple levels of the handling arm components 20a, that is, the handling assembly 100a includes multiple sets of the handling arm components 20a, in which a set of the handling arm components 20a is primarily disposed. The multiple sets of the handling arm components 20a are stacked in parallel with each other, and each adjacent two sets of the handling arm component 20a are slidably connected with each other and may perform reciprocating linear movements along the second reference line S3 relative to each other. A set of the handling arm components 20a at the upper end of the multiple sets of handling arm component 20a are slidably mounted to the side of the bearing plate 13 facing the base main body 11, and may perform reciprocating linear movements relative to the bearing plate 13. The hook 31a is slidably mounted to a set of handling arm components 20 at the lower end of the multiple sets of the handling arm components 20, and the hook 31a may perform a reciprocating linear movement relative to the handling arm component 20. Through the above structure, material fetching depth of the handling assembly 100 may be increased, so that the handling assembly 100 can adapt to different warehousing environment.

Figure 10:
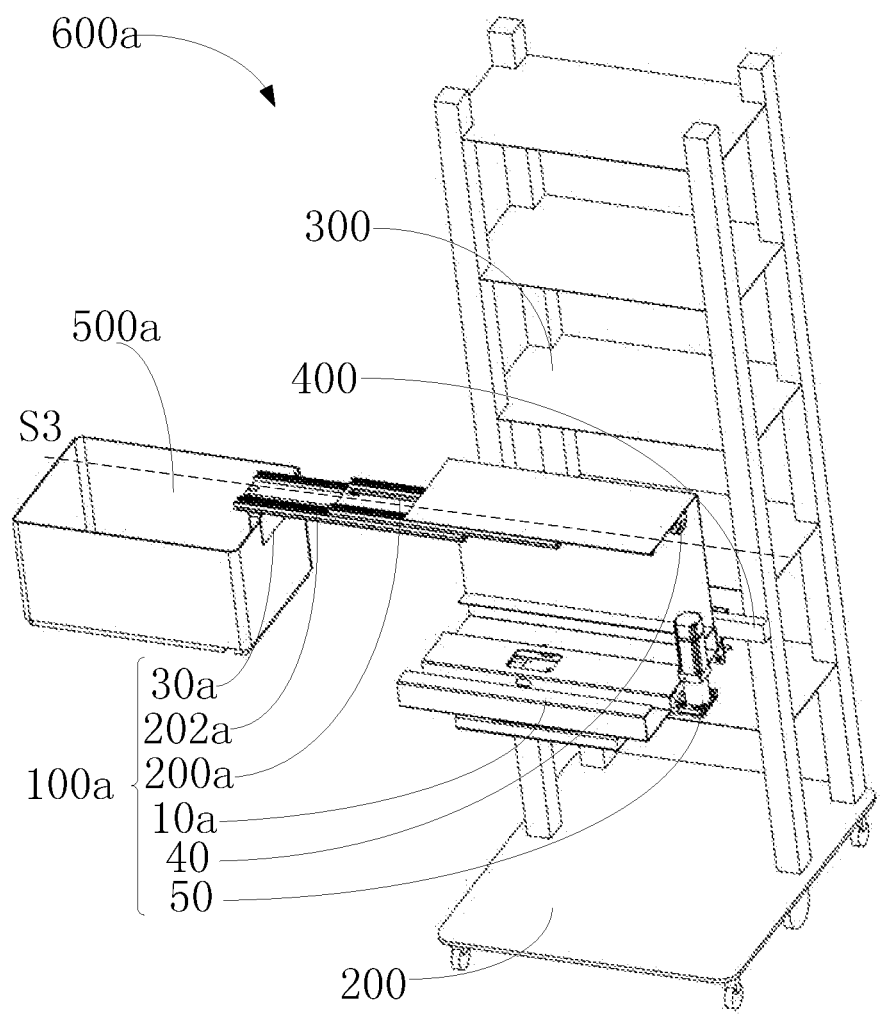
FIG. 10 is a schematic structural diagram of a handling robot provided by still another embodiment of the present application.

Please refer to FIG. 10, still another embodiment of the present application provides a handling robot 600a which includes a mobile chassis 200, a storage shelf 300, a lifting device 400 and the handling assembly 100a. The storage shelf 300 is mounted to the mobile chassis 200, the lifting device 400 is mounted to the storage shelf 300, a plurality of storage pallets are disposed on the storage shelf 300, the storage pallets are used for placing the material box 500a, the handling assembly 100a is mounted to the lifting device 400 through the bracket body 511, the mobile chassis 200 is used for driving the handling robot 600a to arrive at a designated place, and the lifting device 400 is used for controlling the level of the handling assembly 100a, so that the handling assembly 100a may place the material box 500 on the storage shelf 300 after fetching it from the fixed shelf. It should be noted that, in the present embodiment, there is no need to dispose a chute for being hooked by the hook 31a at the bottom of the material box 500a, and the hook 31a directly hooks an upper edge of the material box 500a.

Steps for the handling robot 600a to fetch a material from the fixed shelf are as follows.

The first step, the handling robot 600a is moved to the fixed shelf where the material box 500a is placed along a designated path through the mobile chassis 200, and the mobile chassis 200 is stationary relative to the fixed shelf.

The second step, the handling assembly 100a is driven to move along the vertical direction relative to the fixed shelf through the lifting device 400, so that the handling arm component 20a of the handling assembly 100a is located on a horizontal plane at a preset distance from the top of the material box 500a.

The third step, the handling assembly 100a is rotated around the rotation axis S2 through the rotation component 50, so that the protruding direction of the handling arm component 20a of the handling assembly 100a faces the front of the material box 500a.

The fourth step, the handling arm component 20 protrudes along the second reference line S3 relative to the bearing plate 13, while driving the hooking component 30a to slide toward one end of the handling arm component 20a.

Where the first driving device 41 drives the screw 42 to rotate synchronously along the first rotation direction through the first synchronous belt. At the same time, the moving block 43 moves synchronously along the first horizontal direction relative to the screw, the moving block 43 drives the handling plate 21a of the primary handling arm component 200a to slide out along the first horizontal direction relative to the bearing plate 13. At the same time, the strop of one set of the transmission components of the primary handling arm component 200a pulls the handling plate 21a of the secondary handling arm component 202a to slide out along the first horizontal direction. At the same time, the strop of one set of the transmission components of the secondary handling arm component 202a pulls the hook 31a of the hooking component 30a to slide toward a direction of the distal end of the handling plate 21a of the secondary handling arm component 202a along the first horizontal direction, so that the hook 31a of the hooking component 30a is located at the top of the material box 500a, and the notch of the hook 31a is aligned downward with the upper edge of the material box 500a. The first direction is parallel with the second reference line S3.

The fifth step, the handling assembly 100a is lowered by the lifting device 400, so that the hook 31a hooks the upper edge of the material box 500a.

The sixth step, the handling arm component 20 retracts along the second reference line S3 relative to the bearing plate 13, while driving the hooking component 30a to slide toward the other end of the secondary handling arm component 202a, at the same time, the material box 500a is pulled onto the base main body 11.

Where the first driving device 41 drives, through the first synchronous belt, the screw 42 to synchronously rotate along the second rotation direction, at the same time, the moving block 43 synchronously moves along the second horizontal direction relative to the screw 42, and the moving block 43 drives the handling plate 21a of the primary handling arm component 200a to slides in along the second horizontal direction relative to the bearing plate 13. At the same time, the strop of another set of transmission components of the primary handling arm component 200a pulls the handling plate 21a of the secondary handling arm component 202a to slide in along the second horizontal direction. At the same time, the strop of another set of transmission components of the secondary handling arm component 202a pulls the hook 31a of the hooking component 30a to slide toward the other end of the handling plate 21a of the secondary handling arm component 202a along the second horizontal direction, so that the material box 500a is pulled onto the base main body 11. The second horizontal direction is parallel with the second reference line S3, the first horizontal direction is opposite to the second horizontal direction, and the first rotation direction is opposite to second rotation direction.

The seventh step, the material box located on the base main body 11 is pushed to one storage pallet on the storage shelf 300.

Where the handling assembly 100a is rotated around the rotation axis S2 by the rotation component 50, and the level of the handling assembly 100a is adjusted through the lifting device 400 as required, so that the base main body 11 of the handling assembly 100a is opposite to one storage pallet on the storage shelf 300. And then, the handling arm component 20a is driven to slide out relative to the bearing plate 13, at the same time, the hook 31a slides toward one end of the secondary handling arm component 202a under the driving of one set of the transmission components, and the hook 31a pushes the material box 500a on the base main body 11 to the storage pallet. The handling assembly 100a is lifted by the lifting device 400, so that the hook 31 is separated from the upper edge of the material box 500, and then, the handling arm component 20a and the hook 31 are driven to retract along the second reference line S3.

In the present embodiment, the sliding placement of the hook 31a along the second reference line S3 relative to the bearing plate 13 includes a first displacement section and a second displacement section, and a difference value obtained by the second displacement section subtracting the first displacement section is equal to the depth between the two material boxes 500a adjacent at the front and the back. That is, when the hook 31a slides out the first displacement section along the second reference line S3 relative to the bearing plate 13, a hooking action at a first depth may be performed to fetch a front one of the two material boxes 500a adjacent at the front and the back; and when the hook 31a slides out the second displacement section along the second reference line S3 relative to the bearing plate 13, a hooking action at a second depth may be performed to fetch a back one of the two material boxes 500a adjacent at the front and the back, thereby realizing a function of fetching materials at double depths.

It may be understood that, in some other embodiments, the displacement of the hook 31a relative to the bearing plate 13 may be set to a plurality sections, for example, the displacement includes a first displacement section, a second displacement section and a third displacement section. Three material boxes 500a adjacent at the front and the back located on the fixed shelf may be fetched up in order through the setting of the three-section displacement, thereby realizing a further multiple-section hooking action.

In the present embodiment, the handling assembly 100a is in a double-depth horizontal structure, the bearing plate 13 is mounted to one side of the base main body 11, the primary handling arm component 200a is slidably mounted to a side of the bearing plate 13 facing the base main body 11, the secondary handling arm component 202a is slidably mounted to a side of the primary handling arm component 200a facing the base main body 11, and the hook 31a is slidably mounted to the secondary handling arm component 202a. Through the above structure, the handling assembly 100a may pull and handle the material box 500a from the top of the front thereof without extending into two sides of the material box 500a, thereby saving the working space of the handling assembly 100a, enabling the material boxes 500a of the warehousing to be placed next to each other, and improving the storage density of the warehouse, at the same time, extending a movement strip of the hook 31a, so that the material fetching range of the handling assembly 100a is larger, and the handling assembly 100a may perform a double-depth fetching action to respectively fetch the two material boxes 500a adjacent at the front and the back located on the fixed shelf.

The above contents are only the implementation of the present application, and do not limit the patent scope of the present application. Any equivalent structure or equivalent process transformation made using the contents of the specification and drawings of the present application, or direct or indirect applications in other related technical fields, are all included in the scope of patent protection of the present application.

What is claimed is:

1. A handling assembly, comprising:
a base component;
a handling arm component, slidably mounted to the base component, and being capable of performing a reciprocating linear movement relative to the base component;
a hook, slidably mounted to the handling arm component, and being capable of performing a reciprocating linear movement relative to the handling arm component, and the hook is configured to hook or push a material box; and
a driving component, connected with the handling arm component, for driving the handling arm component and the hook to perform a reciprocating linear movement;
wherein the handling assembly further comprises a rotation component; and
the rotation component is connected to the base component, for driving the base component to perform a rotation movement;
wherein the rotation component comprises a mounting bracket, a rotation mechanism and a rotation driving component;
the rotation mechanism connects the mounting bracket and the base component, and the rotation mechanism is capable of rotating around a rotation axis thereof; and
the rotation driving component is connected to the rotation mechanism, for driving the rotation mechanism to rotate around the rotation axis.

2. The handling assembly according to claim 1, wherein the hook comprises a connection portion and a hooking and pushing portion;
the hooking and pushing portion is connected to the connection portion, and the hooking and pushing portion and the connection portion are at a preset angle; and
the hooking and pushing portion is configured to hook and push the material box, and the connection portion is slidably mounted to the handling arm component.

3. The handling assembly according to claim 2, wherein the hooking and pushing portion is perpendicular to a movement direction in which the hook performs the reciprocating linear movement relative to the handling arm component.

4. The handling assembly according to claim 2, wherein the connection portion and the hooking and pushing portion are disposed vertically.

5. The handling assembly according to claim 2, wherein the hook is in an L-shaped structure or a ⊥-shaped structure or a ⌑-shaped structure.

6. The handling assembly according to claim 1, wherein the handling arm component comprises a handling plate;
the handling plate is slidably mounted to the base component, and is capable of performing a reciprocating linear movement on the base component;
the hook is mounted to the handling plate, and is capable of performing the reciprocating linear movement on the handling plate.

7. The handling assembly according to claim 6, wherein the base component comprises a base main body and a first sliding rail;
the first sliding rail is mounted to the base main body; and
the handling arm component further comprises a first sliding chute, the first sliding chute is mounted to the handling plate and is slidably connected to the first sliding rail, and the handling plate is capable of sliding along the first sliding rail through the first sliding chute;
wherein the handling assembly comprises a hooking component and a transmission component, the hooking component comprises a sliding block and the hook, and the transmission component connects the base component and the hook, and the transmission component is configured to drive the hook to perform the reciprocating linear movement on the handling plate;
the handling arm component further comprises a second sliding rail, and the second sliding rail is mounted to the handling plate; and
the sliding block is mounted to the hook, and is slidably connected to the second sliding rail, and the hook is capable of sliding along the second sliding rail by the sliding block.

8. The handling assembly according to claim 7, wherein the transmission component comprises two movable pulleys and two strops;
each of the movable pulleys is mounted to the handling plate, and each of the strops is wound around a corresponding one of the movable pulleys; and
one end of each of the strops is connected to the hook, and the other end is connected to the base component;
wherein the hooking component further comprises pressing plates;
two pressing plates are both mounted to the hook; and
one end of each of the strops is connected to the hook by a corresponding one of the pressing plates; and
wherein the movable pulley is a flat belt pulley, and the strop is an open-loop flat belt.

9. The handling assembly according to claim 7, wherein a slot which is recessed for a component to slide therein is disposed in the middle of the handling plate; and
the hooking component, the second sliding rail and the transmission component are all mounted to the slot.

10. The handling assembly according to claim 6, wherein the handling plate further comprises side baffles;
two side baffles are respectively connected to two sides of the handling plate, and the two side baffles are configured to correct a posture of the material box when bearded by the handling plate, while preventing the material box from sliding off the handling plate.

11. The handling assembly according to claim 6, wherein the handling plate further comprises a guide plate; and
the guide plate is connected to a distal end of the handling plate, and is disposed at a preset included angle with the handling plate, and the guide plate is configured to guide when the material box is pulled onto the handling plate;
wherein the guide plate comprises a first guide plate and a second guide plate;
the first guide plate is disposed at an included angle in a horizontal direction with the handling plate, and is connected to the distal end of the handling plate, for guiding in the horizontal direction when the material box is pulled onto the handling plate; and
two second guide plates are respectively disposed at an included angle in a vertical direction with two sides of the handling plate, and are respectively fixedly connected to distal ends of two sides of the handling plate, for guiding in the vertical direction when the material box is pulled onto the handling plate.

12. The handling assembly according to claim 1, wherein the driving component comprises a first driving device, a lead screw and a moving block;
the first driving device and the lead screw are both mounted to the base component;
an output end of the first driving device is connected with the lead screw;
the moving block is mounted to the handling arm component, and the moving block is in a threaded connection with the lead screw; and
the first driving device is configured to drive the lead screw to rotate relative to the base component, so that the moving block moves along the lead screw relative to the base component, to drive the handling arm component to perform a reciprocating linear movement relative to the base component.

13. The handling assembly according to claim 1, wherein the base component comprises a base main body and a bearing plate;
the bearing plate is fixedly connected to a side of the base main body;
the handling arm component is slidably mounted to a side of the bearing plate facing the base main body, and the handling arm component is capable of performing a reciprocating linear movement relative to the bearing plate; and
the hook is slidably mounted to the handling arm component, and the hook is capable of performing a reciprocating linear movement relative to the handling arm component.

14. The handling assembly according to claim 13, wherein the handling assembly comprises a plurality of sets of the handling arm components;
the plurality of sets of the handling arm components are stacked in parallel with each other, and every two adjacent sets of the handling arm components are slidably connected to each other, and are capable of performing a reciprocating linear movement relative to each other;
a set of the handling arm components at an upper end of the plurality of sets of the handling arm components is slidably mounted to a side of the bearing plate facing the base main body, and is capable of performing a reciprocating linear movement relative to the bearing plate; and
the hook is slidably mounted to a set of the handling arm components at a lower end of the plurality of sets of the handling arm components, and the hook is capable of performing a reciprocating linear movement relative to the handling arm component.

15. The handling assembly according to claim 1, wherein the rotation mechanism comprises a slewing bearing, a circular light pulley and a connection plate;
   the slewing bearing comprises an inner ring and an outer ring;
   the outer ring is sleeved on the inner ring, the outer ring is mounted to the mounting bracket, and the inner ring is capable of rotating around the rotation axis relative to the outer ring;
   the connection plate is connected to the inner ring, and is capable of rotating around the rotation axis with the inner ring;
   the circular light pulley is sleeved on the outer ring, and is mounted to the mounting bracket;
   the base component is mounted to the connection plate; and
   the rotation driving component connects the connection plate and the circular light pulley, and is configured to drive the connection plate to rotate around the rotation axis relative to the circular light pulley.

16. The handling assembly according to claim 15, wherein the rotation driving component comprises a second driving device, a second synchronous belt pulley and a second synchronous belt;
   the second driving device is connected to the connection plate;
   the second synchronous belt pulley is connected to an output end of the second driving device; and
   one end of the second synchronous belt is sleeved on the second synchronous belt pulley, and the other end is sleeved on the circular light pulley.

17. The handling assembly according to claim 1, wherein the rotation component further comprises a rotation controlling component, the rotation controlling component is configured to control the rotation mechanism to rotate around the rotation axis by the rotation driving component.

18. The handling assembly according to claim 1, wherein the rotation component further comprises a rotation caging device, and the rotation caging device is configured to control the rotation mechanism to rotate around the rotation axis in a preset angle range.

19. A handling robot, comprising:
   a mobile chassis;
   a storage shelf, mounted to the mobile chassis;
   a lifting device, mounted to the storage shelf; and
   a handling assembly, mounted to the lifting device, and the lifting device is configured to control the level of the handling assembly;
   wherein the handling assembly comprises:
   a base component;
   a handling arm component, slidably mounted to the base component, and being capable of performing a reciprocating linear movement relative to the base component;
   a hook, slidably mounted to the handling arm component, and being performing a reciprocating linear movement relative to the handling arm component, and the hook is configured to hook or push a material box; and
   a driving component, connected with the handling arm component, for driving the handling arm component and the hook to perform a reciprocating linear movement,
   wherein the handling arm component comprises a handling plate;
   the handling plate is slidably mounted to the base component, and is capable of performing a reciprocating linear movement on the base component;
   the hook is mounted to the handling plate, and is capable of performing the reciprocating linear movement on the handling plate;
   wherein the handling plate further comprises a guide plate; and
   the guide plate is connected to a distal end of the handling plate, and is disposed at a preset included angle with the handling plate, and the guide plate is configured to guide when the material box is pulled onto the handling plate;
   wherein the guide plate comprises a first guide plate and a second guide plate;
   the first guide plate is disposed at an included angle in a horizontal direction with the handling plate, and is connected to the distal end of the handling plate, for guiding in the horizontal direction when the material box is pulled onto the handling plate; and
   two second guide plates are respectively disposed at an included angle in a vertical direction with two sides of the handling plate, and are respectively fixedly connected to distal ends of two sides of the handling plate, for guiding in the vertical direction when the material box is pulled onto the handling plate.

* * * * *